(12) United States Patent  
Hong

(10) Patent No.: US 12,477,533 B2
(45) Date of Patent: Nov. 18, 2025

(54) UPLINK SCHEDULING METHOD, APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 355 days.

(21) Appl. No.: 18/034,244

(22) PCT Filed: Oct. 28, 2020

(86) PCT No.: PCT/CN2020/124368
§ 371 (c)(1),
(2) Date: Apr. 27, 2023

(87) PCT Pub. No.: WO2022/087886
PCT Pub. Date: May 5, 2022

(65) Prior Publication Data
US 2023/0389009 A1    Nov. 30, 2023

(51) Int. Cl.
*H04W 72/04* (2023.01)
*H04W 56/00* (2009.01)
*H04W 72/1268* (2023.01)

(52) U.S. Cl.
CPC ... *H04W 72/1268* (2013.01); *H04W 56/0045* (2013.01)

(58) Field of Classification Search
None
See application file for complete search history.

(56) References Cited

U.S. PATENT DOCUMENTS

| 2015/0085839 A1 | 3/2015 | Bergstrom et al. |
| 2020/0288422 A1 | 9/2020 | Wei |
| 2020/0314788 A1 | 10/2020 | Yu et al. |
| 2023/0389009 A1* | 11/2023 | Hong ............... H04W 72/1268 |

FOREIGN PATENT DOCUMENTS

| CN | 104272821 A | 1/2015 |
| CN | 109788546 A | 5/2019 |
| CN | 109819511 A | 5/2019 |

(Continued)

OTHER PUBLICATIONS

State Intellectual Property Office of the People's Republic of China, Office Action and Search Report Issued in Application No. 2020800030104, Dec. 6, 2024, 13 pages.

(Continued)

*Primary Examiner* — Willie J Daniel, Jr.
(74) *Attorney, Agent, or Firm* — Volpe Koenig

(57) ABSTRACT

An uplink scheduling method, an apparatus, and a storage medium that improves scheduling in a wireless communication network. The scheduling is improved by obtaining a first timing advance (TA) duration for a terminal measured and sent by a base station; determining a number of target uplink slots based on the first TA duration, where the target uplink slots are one or more uplink slots after a measurement gap during which signal transmissions are not able to be conducted; and reporting the number of the target uplink slots to the base station.

15 Claims, 8 Drawing Sheets

(56) References Cited

FOREIGN PATENT DOCUMENTS

| WO | 2020/027615 A1 | 2/2020 |
|----|----------------|--------|
| WO | 2020064698 A1  | 4/2020 |
| WO | 2020192789 A1  | 10/2020 |

OTHER PUBLICATIONS

ISA State Intellectual Property Office of the People's Republic of China, International Search Report Issued in Application No. PCT/CN2020/124368, Jul. 26, 2021, WIPO, 4 pages.
European Patent Office, Extended European Search Report Issued in Application No. 20959049.6, Dec. 12, 2023, Germany, 12 pages.
ISA State Intellectual Property Office of the People's Republic of China, Written Opinion of the International Searching Authority Issued in Application No. PCT/CN2020/124368, Jul. 26, 2021, WIPO, 6 pages.
MediaTek Inc.,"Clarification on UE behavior after measurement gap", 3GPP TSG-RAN WG4 Meeting #90, R4-1900920, Athens, Greece, Feb. 25-Mar. 1, 2019, 5 pages.

* cited by examiner

UPLINK SCHEDULING METHOD, APPARATUS, AND STORAGE MEDIUM

CROSS REFERENCE TO RELATED APPLICATIONS

This application is the national phase of International Application No. PCT/CN2020/124368 filed on Oct. 28, 2020, the disclosure of which is hereby incorporated by reference in its entirety.

TECHNICAL FIELD

The present disclosure relates to the field of communication, and in particular to uplink scheduling methods, apparatuses, and storage media.

BACKGROUND

The current measurement can be divided into intra-frequency measurement and inter-frequency measurement. The intra-frequency measurement needs to meet the following two conditions: center frequencies of a cell where a terminal is currently located and a target cell to be measured are the same; and sub-carrier spacings (SCSs) of the cell where the terminal is currently located and the target cell to be measured need to be the same. Except for the intra-frequency measurement, corresponding measurements in other cases belong to inter-frequency measurement.

If the terminal needs to perform the inter-frequency measurement (including inter-RAT (radio access technology) measurement), a simple way is to install two types of radio frequency (RF) receivers in the terminal (for example, user equipment (UE)) to measure frequencies of the current cell and the target cell respectively. However, this will lead to cost increases and interference between different frequencies.

SUMMARY

To overcome the problems existing in the related art, embodiments of the present disclosure provide uplink scheduling methods, apparatuses, and storage media.

According to a first aspect of the embodiments of the present disclosure, there is provided an uplink scheduling method, applied to a terminal, the method includes:
  obtaining a first timing advance (TA) duration for the terminal measured and sent by a base station;
  determining a number of target uplink slots based on the first TA duration, where the target uplink slots are one or more uplink slots after a measurement gap during which signal transmissions are not able to be conducted; and reporting the number of the target uplink slots to the base station.

According to a second aspect of the embodiments of the present disclosure, there is provided an uplink scheduling method, applied to a base station, the method includes:
  measuring and sending a first timing advance (TA) duration for a terminal to the terminal;
  receiving a number of target uplink slots which is determined based on the first TA duration and sent by the terminal, where the target uplink slots are one or more uplink slots after a measurement gap during which signal transmissions are not able to be conducted; and
  performing, based on the number of the target uplink slots, uplink grant scheduling on uplink slots after the measurement gap is performed by the terminal.

According to a third aspect of the embodiments of the present disclosure, there is provided a computer readable storage medium storing a computer program for performing the uplink scheduling method described in any one of the first aspects.

According to a fourth aspect of the embodiments of the present disclosure, there is provided a computer readable storage medium storing a computer program for performing the uplink scheduling method described in any one of the second aspects.

According to a fifth aspect of the embodiments of the present disclosure, there is provided an uplink scheduling apparatus, including:
  a processor; and
  a memory configured to store instructions executable by the processor;
  where the processor is configured to perform the uplink scheduling method described in any one of the first aspects.

According to a sixth aspect of the embodiments of the present disclosure, there is provided an uplink scheduling apparatus, including:
  a processor; and
  a memory configured to store instructions executable by the processor;
  where the processor is configured to perform the uplink scheduling method described in any one of the second aspects.

It should be understood that the above general descriptions and subsequent detailed descriptions are merely illustrative and explanatory, and shall not constitute limitations to the present disclosure.

BRIEF DESCRIPTION OF THE DRAWINGS

The accompanying drawings, which are incorporated in and constitute a part of this specification, illustrate examples consistent with the present disclosure, and together with the description, serve to explain the principles of the disclosure.

DETAILED DESCRIPTION OF THE EMBODIMENTS

Figure 1:
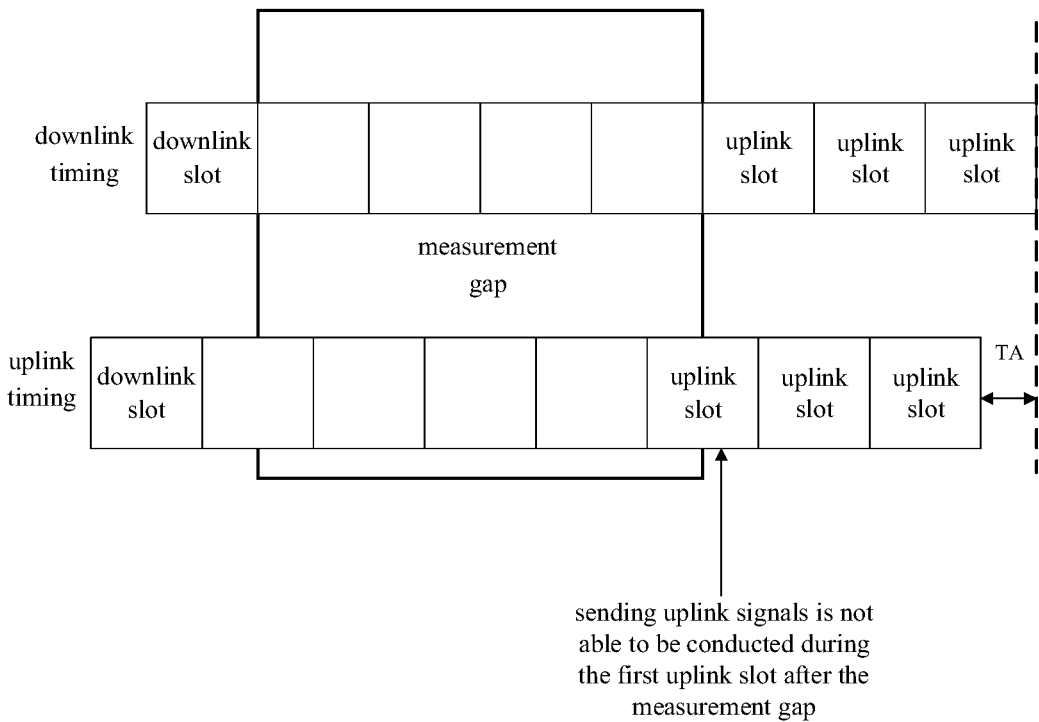
FIG. 1 is a schematic diagram illustrating a scenario where a first slot after a measurement gap is an uplink slot according to an exemplary embodiment.

Exemplary embodiments will be described in detail herein, examples of which are illustrated in the accompanying drawings. When the following descriptions involve the drawings, like numerals in different drawings refer to like or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

Terms used in the embodiments of the present disclosure are for the purpose of describing specific embodiments only, and are not intended to limit the present disclosure. The singular forms "a," "an," and "this" used in the embodiments of the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although terms first, second, third, etc. may be used in the embodiments of the present disclosure to describe various information, such information should not be limited to these terms. These terms are only used to distinguish the same type of information from each other. For example, first information may also be referred to as second information, and similarly, the second information may also be referred to as the first information without departing from the scope of the present disclosure. Depending on the context, the word "if" as used herein can be interpreted as "at the time of," "when," or "in response to determining."

To solve the problem of cost increase and interference between different frequencies, the 3rd generation partnership project (3GPP) proposed a manner of a measurement gap. For example, a certain amount of time (i.e., time of the measurement gap) is reserved, during which the terminal will not send or receive any data, and a receiver will be tuned to the frequency of the target cell for inter-frequency measurement, and then will be switched to the frequency of the current cell at the end of the time of the measurement gap. Further, in a current protocol, an interruption requirement caused by the measurement gap is defined.

At present, a base station side will set timing advances (TAs) for terminals in cells covered by the base station itself, so that the terminals at different distances from the base station can send uplink signals at different slots in advance to ensure that these uplink signals can reach the base station synchronously, thus avoiding the interference between uplink signals from different terminals.

However, for time division duplex (TDD) carriers, in the scenario where a first slot after the measurement gap is an uplink slot, due to the presence of a timing advance (TA), sending uplink signals may not be able to be conducted during the first or second uplink slot after the gap measurement. However, a network side will still schedule uplink (UL) grants on these uplink slots, resulting in a waste of resources and signaling scheduling.

For example, as shown in FIG. 1, in scenarios where a first slot after a measurement gap is an uplink slot, the uplink slot may be covered by the measurement gap, resulting in the problem of sending uplink signals not being able to be conducted during the first or second uplink slot after the gap measurement.

Since whether a signal can be sent at the first and second uplink slots after the measurement gap depends on the implementation of a terminal side, and a network side cannot obtain this information, the network side will still schedule uplink (UL) grants on these uplink slots, causing a waste of resources and signaling scheduling.

To address at least the above problems, the present disclosure provides an uplink scheduling solution for the scenarios where the first slot after the measurement gap is an uplink slot, which can avoid the waste of resources and signaling scheduling.

Next, the uplink scheduling solution provided by the present disclosure will be introduced from the terminal side.

Figure 2:
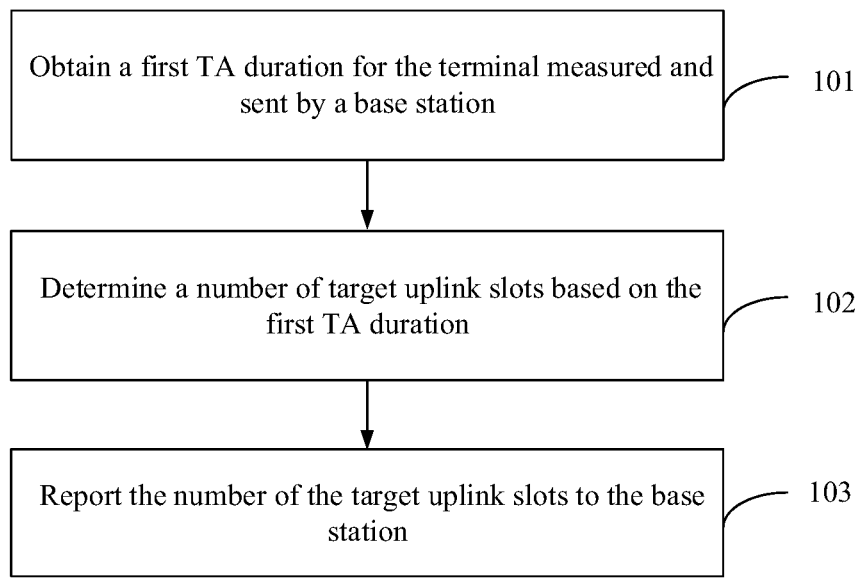
FIG. 2 is a schematic flowchart illustrating an uplink scheduling method according to an exemplary embodiment.

An embodiment of the present disclosure provides an uplink scheduling method, as shown in FIG. 2. FIG. 2 is a flowchart of an uplink scheduling method according to an embodiment, which can be applied to a terminal. The method can include the following steps.

In step 101, a first TA duration for the terminal measured and sent by a base station is obtained.

In the embodiment of the present disclosure, the base station can obtain the latest first TA duration for a current location of the terminal by measuring one or more uplink signals sent by the terminal, and send the first TA duration to the terminal through TA signaling. The terminal can obtain the first TA duration after demodulating the TA signaling.

In step 102, a number of target uplink slots is determined based on the first TA duration.

In the embodiment of the present disclosure, the target uplink slots are one or more uplink slots after a measurement gap during which signal transmissions are not able to be conducted.

In step 103, the number of the target uplink slots is reported to the base station.

In the embodiment of the present disclosure, the terminal can report the number of the target uplink slots to the base station through a target signaling, so that the base station can perform corresponding uplink scheduling. The target signaling includes but is not limited to radio resource control (RRC) signaling, media access control (MAC) signaling, etc.

In the above embodiment, the terminal can obtain the first TA duration measured and sent by the base station, and determine the number of the target uplink slots based on the first TA duration. The target uplink slots are one or more uplink slots after a measurement gap during which signal transmissions are not able to be conducted. Further, the terminal can report the number of the target uplink slots to the base station, so that the base station can perform uplink grant scheduling on uplink slots after the measurement gap is performed by the terminal. Thus, the waste of resources and signaling scheduling is avoided, the usability is high.

In an example, for the above step 102, specifically, in response to determining that the first TA duration is less than or equal to a length of one slot, the terminal may determine that the number of the target uplink slots is one, and in response to determining that the first TA duration is greater than the length of one slot, the terminal may determine that the number of the target uplink slots is two.

The maximum value of TA specified in the current protocol is 2, and accordingly, the maximum number of the target uplink slots is 2. If the maximum value of TA is modified in subsequent standards, the maximum value of the target uplink slots corresponding to the modified scheme should also fall within the protection scope of the present disclosure.

In the above embodiment, the number of uplink slots after the measurement gap during which signal transmissions are not able to be conducted can be determined based on the first TA duration measured and sent by the base station, and the usability is high.

Figure 3:
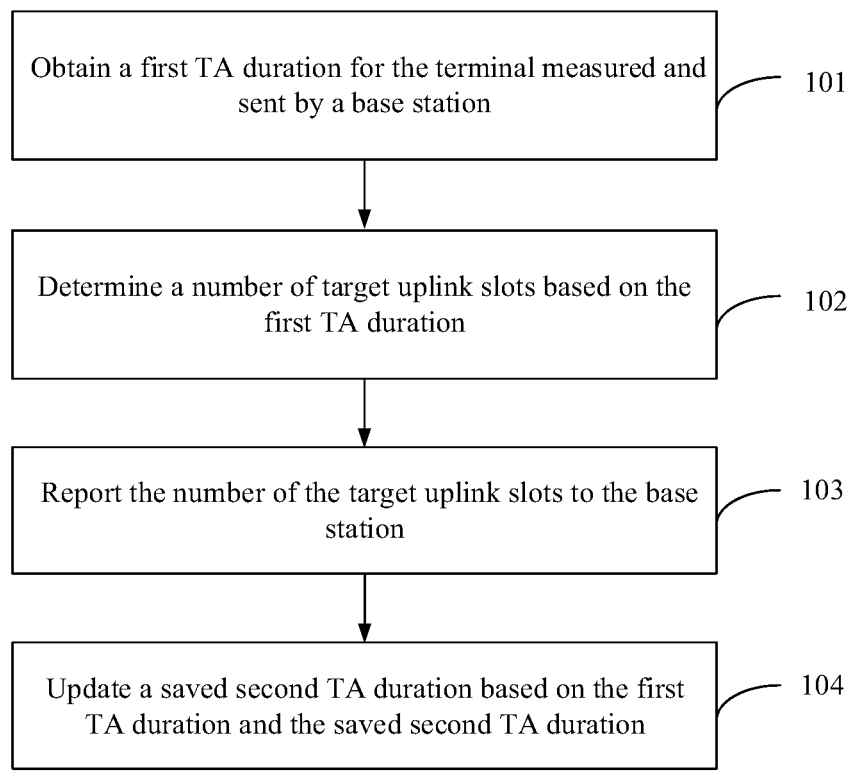
FIG. 3 is a schematic flowchart illustrating another uplink scheduling method according to an exemplary embodiment.

In an example, referring to FIG. 3, FIG. 3 is a flowchart of another uplink scheduling method according to the embodiment shown in FIG. 2. The method may further include the following steps.

In step 104, a saved second TA duration is updated based on the first TA duration and the saved second TA duration.

In the embodiment of the present disclosure, the order of performing step 104 is not limited, and this step can be performed after step 101, or after step 102 or step 103.

The terminal can update the saved second TA duration based on its own saved second TA duration and the latest first TA duration sent by the base station.

In an example, in response to determining that there is no cross-slot change between the first TA duration and the saved second TA duration, the terminal may update the saved second TA duration based on the first TA duration, the saved second TA duration, and at least one preset value.

If the first TA duration and the saved second TA duration are both less than or equal to a length of one slot, or the first TA duration and the saved second TA duration are both greater than the length of one slot, it can be determined that there is no cross-slot change between the first TA duration and the saved second TA duration.

Specifically, if the first TA duration is less than the length of one slot and the saved second TA duration is less than the length of one slot, it is determined that there is no cross-slot change between the first TA duration and the saved second TA duration.

Or, if the first TA duration is less than the length of one slot and the saved second TA duration is equal to the length of one slot, it is determined that there is no cross-slot change between the first TA duration and the saved second TA duration.

Or, if the first TA duration is equal to the length of one slot and the saved second TA duration is less than the length of one slot, it can also be determined that there is no cross-slot change between the first TA duration and the saved second TA duration.

Or, if the first TA duration is equal to the length of one slot and the saved second TA duration is equal to the length of one slot, it can also be determined that there is no cross-slot change between the first TA duration and the saved second TA duration.

Correspondingly, the saved second TA duration can be updated by, but not limited to, the following formula 1:

$$N_{TA,new}=N_{TA,old}+(T_A-A1)\times A2 \quad \text{Formula 1}$$

$T_A$ is the first TA duration, $N_{TA,old}$ is the saved second TA duration, $N_{TA,new}$ is an updated second TA duration, and A1 and A2 are two preset values. For example, A1 can be 31 and A2 can be 16.

In the embodiment of the present disclosure, if there is no cross-slot change between the first TA duration and the saved second TA duration, it indicates that the location of the terminal has not moved or the distance of moving has not changed significantly. The terminal can adjust the previously saved second TA duration according to the above formula 1, so as to update the saved second TA duration, and the range of the adjustment will not exceed a specified range.

In another example, in response to determining that there is a cross-slot change between the first TA duration and the saved second TA duration, the terminal can directly update the saved second TA duration based on the first TA duration.

If the first TA duration is less than or equal to the length of one slot, but the saved second TA duration is greater than the length of one slot, it indicates that there is a cross-slot change between the first TA duration and the saved second TA duration. Or, if the first TA duration is greater than the length of one slot, but the saved second TA duration is less than or equal to the length of one slot, it also indicates that there is a cross-slot change between the first TA duration and the saved second TA duration.

Specifically, if the first TA duration is less than the length of one slot and the saved second TA duration is greater than the length of one slot, it is determined that there is a cross-slot change between the first TA duration and the saved second TA duration.

Or, if the first TA duration is equal to the length of one slot and the saved second TA duration is greater than the length of one slot, it can also be determined that there is a cross-slot change between the first TA duration and the saved second TA duration.

Or, if the first TA duration is greater than the length of one slot and the saved second TA duration is less than the length of one slot, it can also be determined that there is a cross-slot change between the first TA duration and the saved second TA duration.

Or, if the first TA duration is greater than the length of one slot and the saved second TA duration is equal to the length of one slot, it can also be determined that there is a cross-slot change between the first TA duration and the saved second TA duration.

In the embodiment of the present disclosure, if there is a cross-slot change between the first TA duration and the saved second TA duration, it indicates that the location of the terminal has moved and the distance of moving has changed significantly. If the terminal still adjusts the saved second TA duration according to the above formula 1, the new second TA duration obtained has a significant difference from the actually measured first TA duration. Therefore, in the embodiment of the present disclosure, in this case, the terminal can directly update the saved second TA duration based on the first TA duration.

In an example, if the first TA duration is less than or equal to the length of one slot, but the saved second TA duration is greater than the length of one slot, the saved second TA duration can be directly updated to the first TA duration. For example, the saved second TA duration can be updated to be less than or equal to the length of one slot.

If the first TA duration is greater than the length of one slot, but the saved second TA duration is less than or equal to the length of one slot, the saved second TA duration can be directly updated to the first TA duration. For example, the saved second TA duration can be updated to be greater than the length of one slot.

In the above embodiment, the terminal side can also update the saved second TA duration based on the first TA duration measured by the base station and its own saved second TA duration. Thus, the second TA duration saved by the terminal can be synchronized with the first TA duration measured by the base station as much as possible, the problem of mismatched base station scheduling is avoided, and the usability is high.

Figure 4:
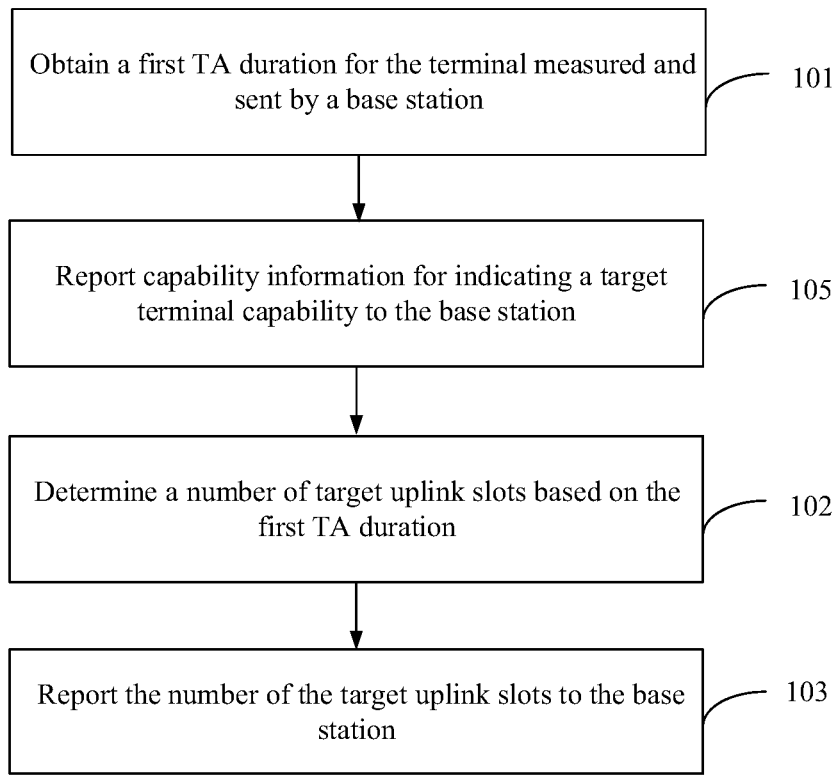
FIG. 4 is a schematic flowchart illustrating yet another uplink scheduling method according to an exemplary embodiment.

In an example, referring to FIG. 4, FIG. 4 is a flowchart of another uplink scheduling method according to the embodiment shown in FIG. 2. The method may further include the following steps.

In step 105, capability information for indicating a target terminal capability is reported to the base station.

In the embodiment of the present disclosure, the order of performing step 105 is not limited. For example, step 105 can be performed after step 101, or after step 102 or 103.

The target terminal capability is for indicating whether the terminal supports a capability of updating a saved second TA duration based on the first TA duration. For example, the target terminal capability indicates whether the terminal supports making a significant adjustment to its own saved TA duration at one time.

In the above embodiment, the terminal reports the capability information for indicating the target terminal capability to the base station, so that the base station can better perform uplink scheduling after determining that the terminal supports updating the saved second TA duration based on the first TA duration, and the usability is high.

In an example, without considering whether to report the number of the target uplink slots to the base station so that the base station can perform uplink grant scheduling on uplink slots after the measurement gap is performed by the terminal, the terminal can determine its own saved second TA duration in different ways.

In the first way, the saved second TA duration can be updated based on the first TA duration measured by the base station, the saved second TA duration, and at least one preset value.

In an example, the saved second TA duration can be updated by formula 1. The specific update method is consistent with the method of updating the saved second TA duration according to formula 1 provided in the above embodiment, and will not be repeated herein.

In an example, the terminal can update the saved second TA duration in this way without supporting the aforementioned target terminal capability. In another example, the terminal can always update the saved second TA duration in this way regardless of whether the terminal supports the target terminal capability. In another example, without considering whether the terminal supports the target terminal capability, and there is no cross-slot change between the first TA duration and the saved second TA duration, the terminal can also update the saved second TA duration in this way.

In the second way, the saved second TA duration can be directly updated based on the first TA duration measured by the base station.

In an example, on the basis of supporting the aforementioned target terminal capability, the terminal can directly update its own saved second TA duration based on the first TA duration measured by the base station, regardless of the previously saved second TA duration. In another example, in the case where the terminal supports the target terminal capability and there is a cross-slot change between the first TA duration and the saved second TA duration, the terminal can directly update its own saved second TA duration based on the first TA duration measured by the base station.

In the above embodiment, the terminal can update the saved second TA duration in any of the above ways, so that the terminal can send uplink signals to the base station based on the updated second TA duration, avoiding the problem of signal interference on the base station side caused by uplink signals sent by multiple terminals do not reach the base station synchronously, the usability is high.

Next, the uplink scheduling solution provided by the present disclosure will be introduced from the base station side.

Figure 5:
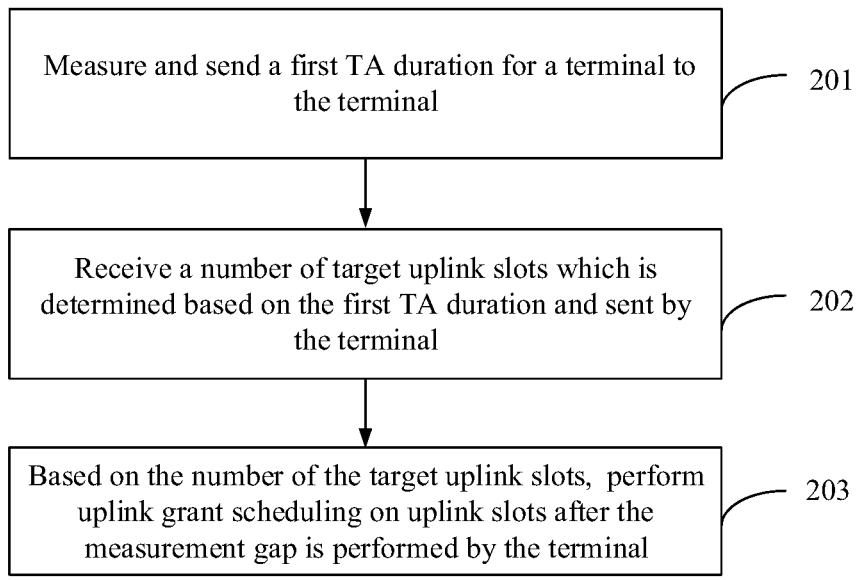
FIG. 5 is a schematic flowchart illustrating an uplink scheduling method according to an exemplary embodiment.

An embodiment of the present disclosure provides an uplink scheduling method, as shown in FIG. 5. FIG. 5 is a flowchart of an uplink scheduling method according to an embodiment, which can be applied to a base station. The method can include the following steps.

In step 201, a first timing advance (TA) duration for a terminal is measured and sent to the terminal.

In the embodiment of the present disclosure, the base station can determine the delay of an uplink signal reaching the base station based on synchronization between the uplink signal sent by the terminal and a downlink signal previously sent by the base station, thereby determining a distance between the terminal and the base station. Further, the latest first TA duration for the current location of the terminal can be determined. In an example, the uplink signal includes but is not limited to at least one of the following: sounding reference signal (SRS), demodulation reference signal (DMRS), channel quality indicator (CQI), acknowledgment (ACK), negative acknowledgment (NACK), physical uplink shared channel (PUSCH), and physical uplink control channel (PUCCH).

In step 202, a number of target uplink slots which is determined based on the first TA duration and sent by the terminal is received.

In the embodiment of the present disclosure, the target uplink slots are one or more uplink slots after a measurement gap during which signal transmissions are not able to be conducted. The terminal can report the number of the target uplink slots to the base station through a target signaling, and the base station can directly receive the number of the target uplink slots. The target signaling includes but is not limited to RRC signaling, MAC signaling, etc.

In step 203, based on the number of the target uplink slots, uplink grant scheduling is performed on uplink slots after the measurement gap is performed by the terminal.

In the embodiment of the present disclosure, according to the current protocol, the maximum value of TA is 2, and correspondingly, the maximum number of the target uplink slots is 2. Therefore, the base station can perform uplink grant scheduling from the second or third uplink slot after the measurement gap is performed by the terminal.

In the above embodiment, based on the number of the target uplink slots fed back by the terminal, the base station performs the uplink grant scheduling on the uplink slots after the measurement gap is performed by the terminal, which avoids waste of resources and signaling scheduling and has high usability.

Figure 6A:
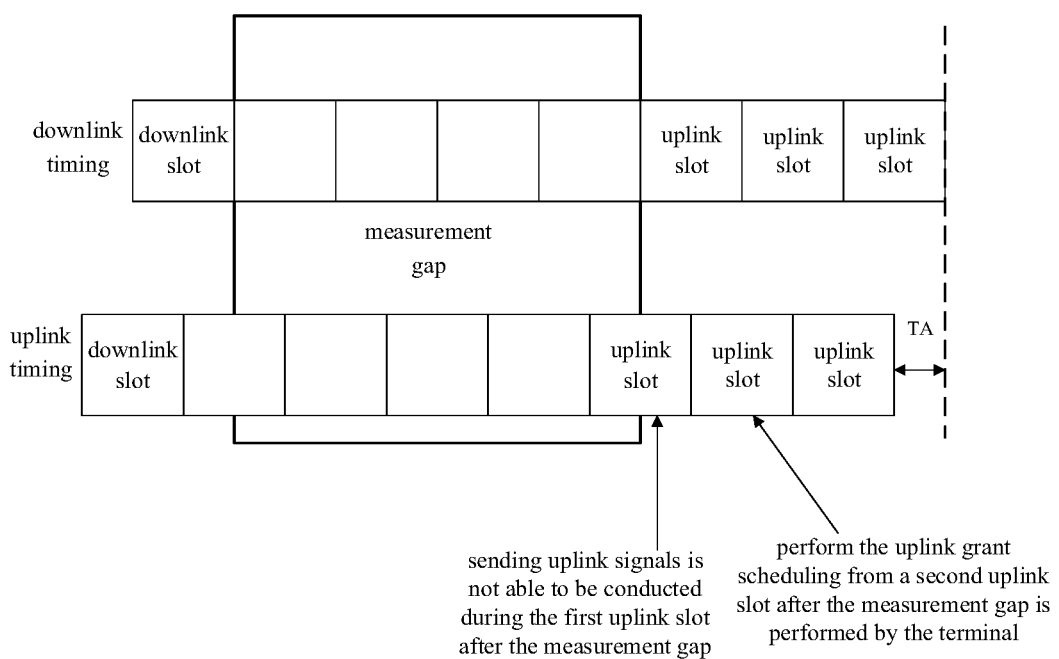
FIG. 6A is a schematic diagram illustrating an uplink scheduling scenario according to an exemplary embodiment.

In an example, if the number of the target uplink slots is one, the base station can directly perform uplink grant scheduling from the second uplink slot after the measurement gap is performed by the terminal, as shown in FIG. 6A.

Figure 6B:
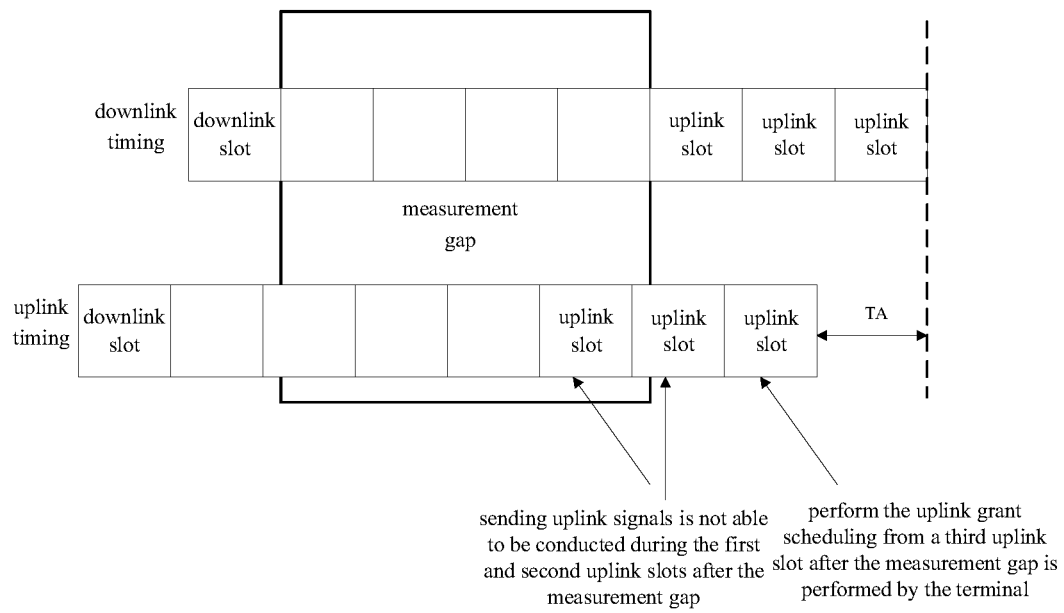
FIG. 6B is a schematic diagram illustrating another uplink scheduling scenario according to an exemplary embodiment.

If the number of the target uplink slots is two, the base station can perform uplink grant scheduling from the third uplink slot after the measurement gap is performed by the terminal, as shown in FIG. 6B.

In the above embodiment, based on the number of the target uplink slots, the base station can perform the uplink grant scheduling from the second or third uplink slot after the measurement gap is performed by the terminal, which avoids resource waste caused by performing uplink grant scheduling on the first uplink slot after the measurement gap.

Figure 7:
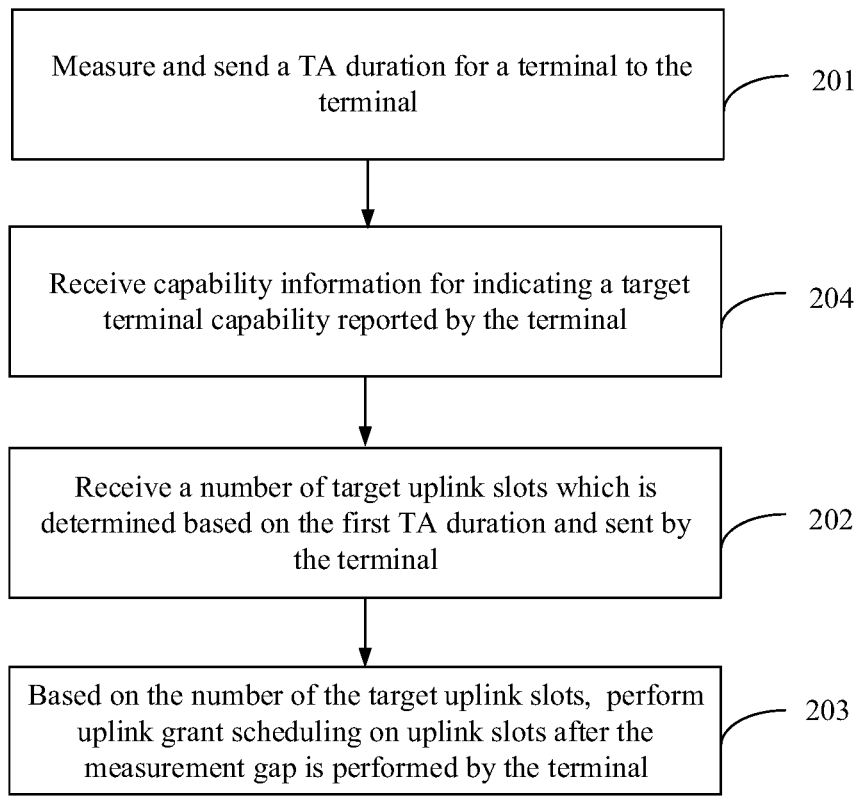
FIG. 7 is a schematic flowchart illustrating another uplink scheduling method according to an exemplary embodiment.

In an example, referring to FIG. 7, FIG. 7 is a flowchart of another uplink scheduling method according to the embodiment shown in FIG. 5. The method may further include the following steps.

In step 204, capability information for indicating a target terminal capability reported by the terminal is received.

In the embodiment of the present disclosure, the order of performing step 204 is also not limited. The target terminal capability is used for indicating whether the terminal supports a capability of updating a saved second TA duration based on the first TA duration. For example, the target terminal capability indicates whether the terminal supports a capability of making a significant adjustment to its own saved TA duration at one time.

In the embodiment of the present disclosure, if the base station determines that the terminal supports the target terminal capability, the base station can continue to perform step 203. For example, based on the number of the target uplink slots, the base station performs the uplink grant scheduling on the uplink slots after the measurement gap is performed by the terminal.

In the above embodiment, the base station can better perform uplink scheduling after determining that the terminal supports the capability of updating the saved second TA duration based on the first TA duration, and the usability is high.

Figure 8:
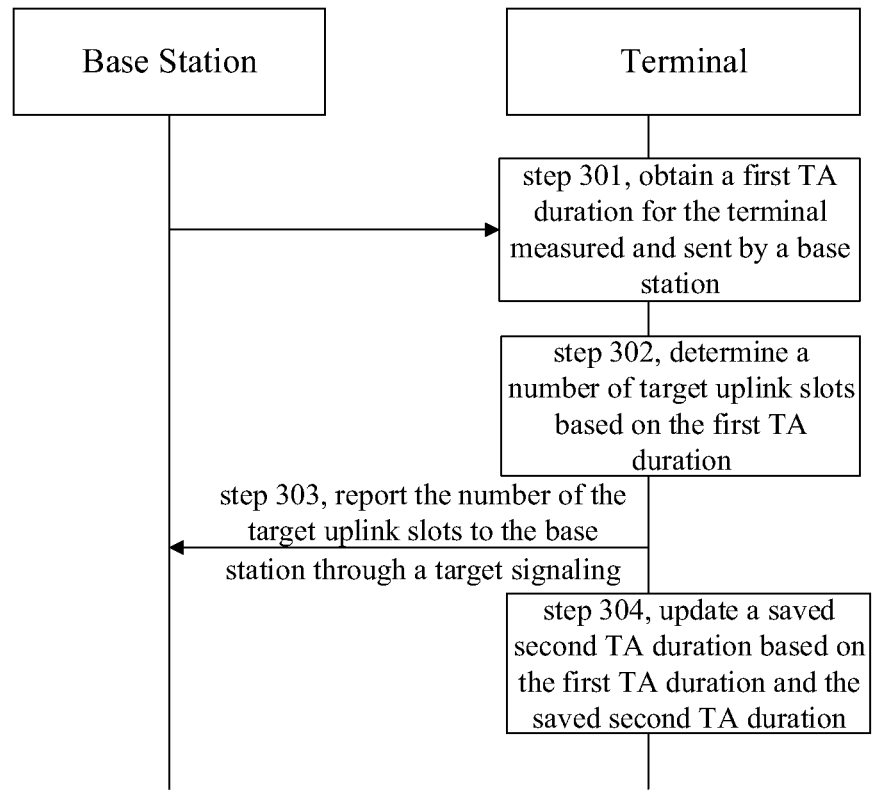
FIG. 8 is a schematic flowchart illustrating yet another uplink scheduling method according to an exemplary embodiment.

The embodiment of the present disclosure provides another uplink scheduling method, as shown in FIG. 8. FIG. 8 is a flowchart of another uplink scheduling method according to an embodiment, which can include the following steps.

In step 301, a terminal obtains a first TA duration for the terminal measured and sent by a base station.

In step 302, the terminal determines a number of target uplink slots based on the first TA duration.

The target uplink slots are one or more uplink slots after a measurement gap during which signal transmissions are not able to be conducted.

In step 303, the terminal reports the number of the target uplink slots to the base station through a target signaling.

In step 304, the terminal updates a saved second TA duration based on the first TA duration and the saved second TA duration.

The way to update the saved second TA duration is the same as that provided in the above embodiments, and will not be repeated herein.

In the above embodiment, the terminal can obtain the first TA duration measured and sent by the base station, and determine the number of the target uplink slots based on the first TA duration. The target uplink slots are one or more uplink slots after a measurement gap during which signal transmissions are not able to be conducted. Further, the terminal can report the number of the target uplink slots to the base station, so that the base station can perform uplink grant scheduling on uplink slots after the measurement gap is performed by the terminal. Thus, the waste of resources and signaling scheduling is avoided, and the usability is high.

Corresponding to the aforementioned embodiments of application function implementation methods, the present disclosure also provides embodiments of application function implementation apparatuses.

Figure 9:
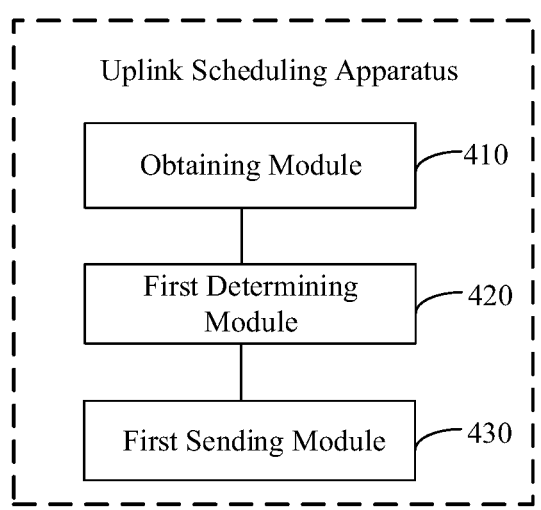
FIG. 9 is a block diagram illustrating an uplink scheduling apparatus according to an exemplary embodiment.

Referring to FIG. 9, FIG. 9 is a block diagram of an uplink scheduling apparatus according to an exemplary embodiment, which is applied to a terminal and includes:

an obtaining module 410, configured to obtain a first timing advance (TA) duration for the terminal measured and sent by a base station;

a first determining module 420, configured to determine a number of target uplink slots based on the first TA duration, where the target uplink slots are one or more uplink slots after a measurement gap during which signal transmissions are not able to be conducted; and a first sending module 430, configured to report the number of the target uplink slots to the base station.

In an example, the first determining module includes:

a first determining submodule, configured to, in response to the first TA duration being less than or equal to a length of one slot, determine that the number of the target uplink slots is one; and a second determining submodule, configured to, in response to the first TA duration being greater than the length of one slot, determining that the number of the target uplink slots is two.

In an example, the first sending module includes:

a sending submodule, configured to report the number of the target uplink slots to the base station through a target signaling.

In an example, the apparatus further includes:

a second determining module, configured to update a saved second TA duration based on the first TA duration and the saved second TA duration.

In an example, the second determining module includes any of the following:

a second determining submodule, configured to, in response to determining that there is no cross-slot change between the first TA duration and the saved second TA duration, update the saved second TA duration based on the first TA duration, the saved second TA duration, and at least one preset value; or a third determining submodule, configured to, in response to determining that there is a cross-slot change between the first TA duration and the saved second TA duration, update the saved second TA duration based on the first TA duration.

In an example, the second determining submodule includes:

a first determining unit, configured to, in response to the first TA duration and the saved second TA duration being both less than or equal to a length of one slot, determine that there is no cross-slot change between the first TA duration and the saved second TA duration; or a second determining unit, configured to, in response to the first TA duration and the saved second TA duration being both greater than the length of one slot, determine that there is no cross-slot change between the first TA duration and the saved second TA duration.

In an example, the third determining submodule includes:

a third determining unit, configured to, in response to the first TA duration being less than or equal to a length of one slot and the saved second TA duration being greater than the length of one slot, determine that there is the cross-slot change between the first TA duration and the saved second TA duration; or a fourth determining unit, configured to, in response to the first TA duration being greater than the length of one slot and the saved second TA duration being less than or equal to the length of one slot, determine that there is the cross-slot change between the first TA duration and the saved second TA duration.

In an example, the apparatus further includes:

a reporting module, configured to report capability information for indicating a target terminal capability to the base station, where the target terminal capability is for indicating whether the terminal supports a capability of updating a saved second TA duration based on the first TA duration.

Figure 10:
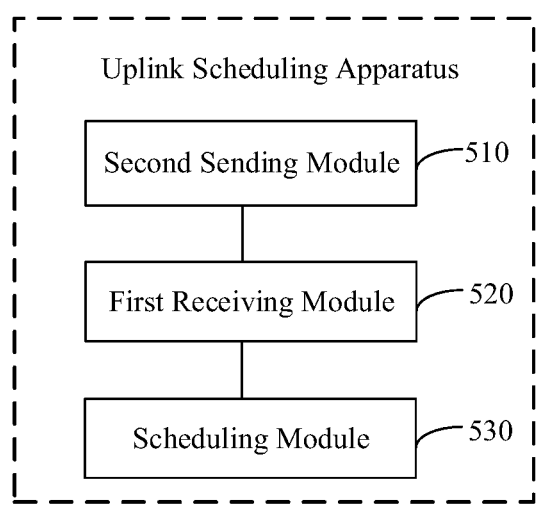
FIG. 10 is a block diagram illustrating another uplink scheduling apparatus according to an exemplary embodiment.

Referring to FIG. 10, FIG. 10 is a block diagram of another uplink scheduling apparatus according to an exemplary embodiment, which is applied to a base station and includes:

a second sending module 510, configured to measure and send a first timing advance (TA) duration for a terminal to the terminal;

a first receiving module 520, configured to receive a number of target uplink slots, which is determined based on the first TA duration and sent by the terminal, where the target uplink slots are one or more uplink slots after a measurement gap during which signal transmissions are not able to be conducted; and a scheduling module 530, configured to, perform, based on the number of the target uplink slots, uplink grant scheduling on uplink slots after the measurement gap is performed by the terminal.

In an example, the scheduling module includes:

a first scheduling submodule, configured to, in response to that the number of the target uplink slots is one, perform the uplink grant scheduling from a second uplink slot after the measurement gap is performed by the terminal; or a second scheduling submodule, configured to, in response to the number of the target uplink slots being two, perform the uplink grant scheduling from a third uplink slot after the measurement gap is performed by the terminal.

In an example, the apparatus further includes:

a second receiving module, configured to receive capability information for indicating a target terminal capability reported by the terminal, where the target terminal capability is for indicating whether the terminal supports a capability of updating a saved second TA duration based on the first TA duration; and a control module, configured to, in response to that the terminal supports the capability of updating the saved second TA duration based on the first TA duration, control the scheduling module to perform, based on the number of the target uplink slots, the uplink grant scheduling on the uplink slots after the measurement gap is performed by the terminal.

Since apparatus embodiments basically correspond to method embodiments, the description of method embodiments can be made reference for relevant information. The apparatus embodiments described above are only schematic, where the above units described as separate components may or may not be physically separated, and the components displayed as units may or may not be physical units. For example, they can be located in one place or distributed to multiple network units. Some or all of the modules can be selected according to actual needs to achieve the purpose of the solution in the present disclosure. Ordinary technical personnel in the art can understand and implement without creative labor.

Correspondingly, the present disclosure also provides a computer readable storage medium that stores a computer program for performing any one of the uplink scheduling methods described above for a terminal side.

Correspondingly, the present disclosure also provides a computer readable storage medium that stores a computer program for performing any one of the uplink scheduling methods described above for a base station side.

Correspondingly, the present disclosure also provides an uplink scheduling apparatus, including:

a processor; and a memory configured to store instructions executable by the processor;

where the processor is configured to perform any one of the uplink scheduling methods described above for a terminal side.

Figure 11:
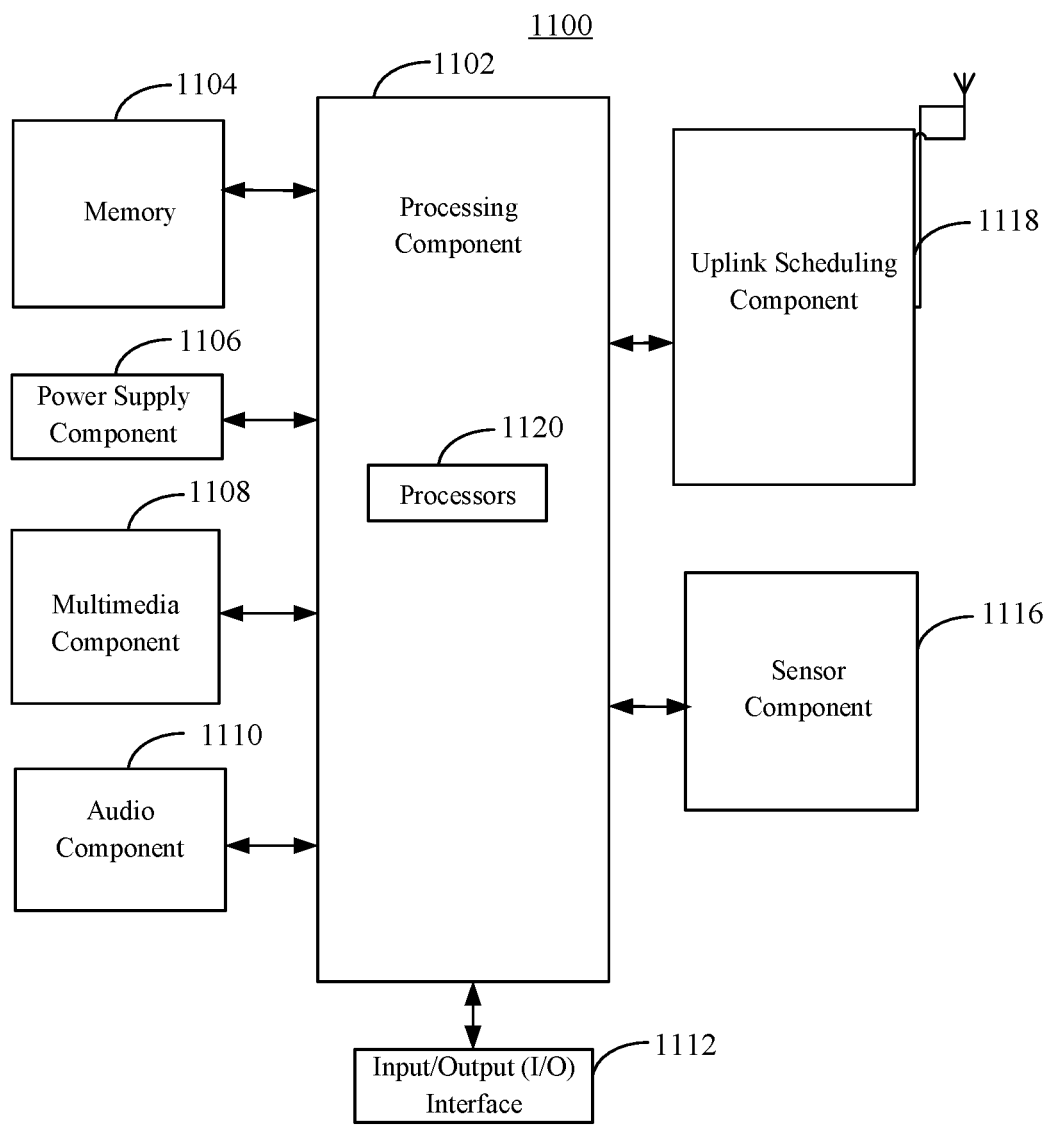
FIG. 11 is a schematic structural diagram illustrating an uplink scheduling apparatus according to an exemplary embodiment of the present disclosure.

FIG. 11 is a block diagram of an electronic device 1100 according to an exemplary embodiment. For example, the electronic device 1100 can be a mobile phone, a tablet computer, an e-book reader, a multimedia player, a wearable device, a vehicle terminal, an iPad, a smart TV, and other terminals.

Referring to FIG. 11, the electronic device 1100 may include one or more of the following components: a processing component 1102, a memory 1104, a power supply component 1106, a multimedia component 1108, an audio component 1110, an input/output (I/O) interface 1112, a sensor component 1116, and an uplink scheduling component 1118.

The processing component 1102 generally controls overall operations of the electronic device 1100, such as operations associated with display, phone calls, data uplink scheduling, camera operations, and recording operations. The processing component 1102 may include one or more processors 1120 to execute instructions to complete all or part of the steps of the above uplink scheduling methods. In addition, the processing component 1102 may include one or more modules that facilitate the interaction between the processing component 1102 and other components. For example, the processing component 1102 may include a multimedia module to facilitate the interaction between the multimedia component 1108 and the processing component 1102. For example, the processing component 1102 can read executable instructions from a memory to implement the steps of an uplink scheduling method provided by the above embodiments.

The memory 1104 is configured to store various types of data to support the operation of the electronic device 1100. Examples of such data include instructions for any application or method operated on the electronic device 1100, contact data, phonebook data, messages, pictures, videos, and so on. The memory 1104 may be implemented by any type of volatile or non-volatile storage devices or a combination thereof, such as a Static Random Access Memory (SRAM), an Electrically Erasable Programmable Read Only Memory (EEPROM), an Erasable Programmable Read Only Memory (EPROM), a Programmable Read Only memory (PROM), a Read Only Memory (ROM), a magnetic memory, a flash memory, a magnetic or an optical disk.

The power supply component 1106 provides power to various components of the electronic device 1100. The power supply component 1106 may include a power management system, one or more power supplies, and other components associated with generating, managing, and distributing power for the electronic device 1100.

The multimedia component 1108 includes a screen providing an output interface between the electronic device 1100 and a user. In some embodiments, the multimedia component 1108 may include a front camera and/or a rear camera. The front camera and/or rear camera may receive external multimedia data when the electronic device 1100 is in an operating mode, such as a photographing mode or a video mode. Each of the front camera and the rear camera may be a fixed optical lens system or have focal length and optical zooming capability.

The audio component 1110 is configured to output and/or input an audio signal. For example, the audio component 1110 includes a microphone (MIC). When the electronic device 1100 is in an operating mode, such as a call mode, a recording mode, and a voice recognition mode, the MIC is configured to receive an external audio signal. The received audio signal may be further stored in the memory 1104 or transmitted via the uplink scheduling component 1118. In some embodiments, the audio component 1110 further includes a speaker to output an audio signal.

The I/O interface 1112 may provide an interface between the processing component 1102 and peripheral interface modules. The above peripheral interface modules may include a keyboard, a click wheel, buttons, and so on. These buttons may include, but are not limited to, a home button, a volume button, a starting button, and a locking button.

The sensor component 1116 includes one or more sensors to provide status assessments of various aspects for the electronic device 1100. For example, the sensor component 1116 may detect the on/off status of the electronic device 1100, and relative positioning of component, for example, the component is a display and a keypad of the electronic device 1100. The sensor component 1116 may also detect a change in position of the electronic device 1100 or a component of the electronic device 1100, a presence or absence of the contact between a user and the electronic device 1100, an orientation or an acceleration/deceleration of the electronic device 1100, and a change in temperature of the electronic device 1100. The sensor component 1116 may include a proximity sensor to detect the presence of a nearby object without any physical contact. The sensor component 1116 may further include an optical sensor, such as a Complementary Metal Oxide Semiconductor (CMOS) or Charge-coupled Device (CCD) image sensor, which is used in imaging applications. In some embodiments, the sensor component 1116 may further include an acceleration sensor, a gyroscope sensor, a magnetic sensor, a pressure sensor, or a temperature sensor.

The uplink scheduling component 1118 is configured to facilitate wired or wireless uplink scheduling between the electronic device 1100 and other devices. The electronic device 1100 may access a wireless network that is based on an uplink scheduling standard, such as Wi-Fi, 2G, 3G, 4G, 5G, or 6G, or a combination thereof. In an exemplary embodiment, the uplink scheduling component 1118 receives a broadcast signal or broadcast-associated information from an external broadcast management system via a broadcast channel. In an exemplary embodiment, the uplink scheduling component 1118 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an exemplary embodiment, the electronic device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above uplink scheduling method.

In an exemplary embodiment, there is also provided a non-transitory computer readable storage medium including instructions, such as the memory 1104 including instructions. The instructions may be executed by the processor 1120 of the electronic device 1100 to perform the above uplink scheduling methods. For example, the non-transitory computer readable storage medium may be a ROM, a Random Access Memory (RAM), a CD-ROM, a magnetic tape, a floppy disk, an optical data storage device, and the like.

Correspondingly, the present disclosure also provides an uplink scheduling apparatus, including:
 a processor;
 a memory configured to store instructions executable by the processor;
 where the processor is configured to perform any one of the uplink scheduling methods described above for a base station side.

Figure 12:
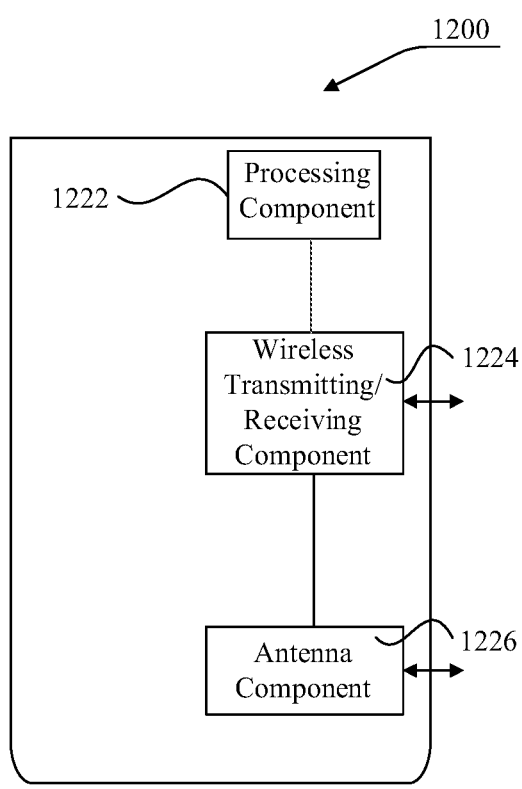
FIG. 12 is a schematic structural diagram illustrating another uplink scheduling apparatus according to an exemplary embodiment of the present disclosure.

As shown in FIG. 12, FIG. 12 is a structural schematic diagram of another uplink scheduling apparatus 1200 according to an exemplary embodiment. The uplink scheduling apparatus 1200 can be provided as a base station. Referring to FIG. 12, the uplink scheduling apparatus 1200 includes a processing component 1222, a wireless transmitting/receiving component 1224, an antenna component 1226, and a signal processing portion unique to one or more wireless interfaces. The processing component 1222 may further include one or more processors.

One of the processors in processing component 1222 can be configured to perform any of the uplink scheduling methods described above.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

The invention claimed is:

1. An uplink scheduling method, applied to a terminal, the uplink scheduling method comprising:
 obtaining a first timing advance (TA) duration for the terminal measured and sent by a base station;
 determining a number of target uplink slots based on the first TA duration, wherein the target uplink slots are one or more uplink slots after a measurement gap during which signal transmissions are not able to be conducted; and
 reporting the number of the target uplink slots to the base station through a target signaling;
 wherein determining the number of the target uplink slots based on the first TA duration comprises:
 in response to the first TA duration being less than or equal to a length of one slot, determining that the number of the target uplink slots is one; and in response to the first TA duration being greater than the length of one slot, determining that the number of the target uplink slots is two.

2. The uplink scheduling method according to claim 1, further comprising:
updating a saved second TA duration based on the first TA duration and the saved second TA duration.

3. The uplink scheduling method according to claim 2, wherein updating the saved second TA duration based on the first TA duration and the saved second TA duration comprises one of:
in response to determining that there is no cross-slot change between the first TA duration and the saved second TA duration, updating the saved second TA duration based on the first TA duration, the saved second TA duration and at least one preset value; or
in response to determining that there is a cross-slot change between the first TA duration and the saved second TA duration, updating the saved second TA duration based on the first TA duration.

4. The uplink scheduling method according to claim 3, wherein determining that there is no cross-slot change between the first TA duration and the saved second TA duration comprises:
in response to the first TA duration and the saved second TA duration being both less than or equal to the length of one slot, determining that there is no cross-slot change between the first TA duration and the saved second TA duration; or
in response to the first TA duration and the saved second TA duration being both greater than the length of one slot, determining that there is no cross-slot change between the first TA duration and the saved second TA duration.

5. The uplink scheduling method according to claim 3, wherein determining that there is the cross-slot change between the first TA duration and the saved second TA duration comprises:
in response to the first TA duration being less than or equal to the length of one slot and the saved second TA duration being greater than the length of one slot, determining that there is the cross-slot change between the first TA duration and the saved second TA duration; or
in response to the first TA duration being greater than the length of one slot and the saved second TA duration being less than or equal to the length of one slot, determining that there is the cross-slot change between the first TA duration and the saved second TA duration.

6. The uplink scheduling method according to claim 1, further comprising:
reporting capability information for indicating a target terminal capability to the base station, wherein the target terminal capability is for indicating whether the terminal supports a capability of updating a saved second TA duration based on the first TA duration.

7. A non-transitory computer readable storage medium storing a computer program for performing the uplink scheduling method according to claim 1.

8. An uplink scheduling method, applied to a base station, the uplink scheduling method comprising:
measuring and sending a first timing advance (TA) duration for a terminal to the terminal;
receiving a number of target uplink slots which is determined based on the first TA duration and sent by the terminal through a target signaling, wherein the target uplink slots are one or more uplink slots after a measurement gap during which signal transmissions are not able to be conducted; and
performing, based on the number of the target uplink slots, uplink grant scheduling on uplink slots after the measurement gap;
wherein performing, based on the number of the target uplink slots, the uplink grant scheduling on the uplink slots after the measurement gap, comprises:
in response to that the number of the target uplink slots is one, performing the uplink grant scheduling from a second uplink slot after the measurement gap; and
in response to that the number of the target uplink slots is two, performing the uplink grant scheduling from a third uplink slot after the measurement gap.

9. The uplink scheduling method according to claim 8, further comprising:
receiving capability information for indicating a target terminal capability reported by the terminal, wherein the target terminal capability is for indicating whether the terminal supports a capability of updating a saved second TA duration based on the first TA duration;
wherein, in response to that the terminal supports the capability of updating the saved second TA duration based on the first TA duration, performing the step of performing, based on the number of the target uplink slots, the uplink grant scheduling on the uplink slots after the measurement gap.

10. A non-transitory computer readable storage medium storing a computer program for performing the uplink scheduling method according to claim 8.

11. An uplink scheduling apparatus, comprising:
a processor; and
a memory configured to store instructions executable by the processor;
wherein the processor is configured to:
obtain a first timing advance (TA) duration for a terminal measured and sent by a base station;
determine a number of target uplink slots based on the first TA duration, wherein the target uplink slots are one or more uplink slots after a measurement gap during which signal transmissions are not able to be conducted; and
report the number of the target uplink slots to the base station through a target signaling;
wherein determining the number of the target uplink slots based on the first TA duration, the processor is configured to:
in response to the first TA duration being less than or equal to a length of one slot, determine that the number of the target uplink slots is one; and
in response to the first TA duration being greater than the length of one slot, determine that the number of the target uplink slots is two.

12. An uplink scheduling apparatus, comprising:
a processor; and
a memory configured to store instructions executable by the processor;
wherein the processor is configured to perform the uplink scheduling method according to claim 8.

13. The uplink scheduling apparatus according to claim 11, the processor is further configured to:
update a saved second TA duration based on the first TA duration and the saved second TA duration.

14. The uplink scheduling apparatus according to claim 13, wherein updating the saved second TA duration based on the first TA duration and the saved second TA duration, the processor is configured to:
- in response to determining that there is no cross-slot change between the first TA duration and the saved second TA duration, update the saved second TA duration based on the first TA duration, the saved second TA duration and at least one preset value; or
- in response to determining that there is a cross-slot change between the first TA duration and the saved second TA duration, update the saved second TA duration based on the first TA duration.

15. The uplink scheduling apparatus according to claim 14, wherein determining that there is no cross-slot change between the first TA duration and the saved second TA duration, the processor is configured to:
- in response to the first TA duration and the saved second TA duration being both less than or equal to the length of one slot, determine that there is no cross-slot change between the first TA duration and the saved second TA duration; or
- in response to the first TA duration and the saved second TA duration being both greater than the length of one slot, determine that there is no cross-slot change between the first TA duration and the saved second TA duration.

\* \* \* \* \*